(12) United States Patent
Currie et al.

(10) Patent No.: US 8,056,525 B2
(45) Date of Patent: Nov. 15, 2011

(54) INDUCTION SYSTEM FOR INTERNAL COMBUSTION ENGINE

(75) Inventors: David Currie, New Hudson, MI (US); Ivan Lazich, Skokie, IL (US)

(73) Assignee: Ford Global Technologies, Dearborn, MI (US)

( * ) Notice: Subject to any disclaimer, the term of this patent is extended or adjusted under 35 U.S.C. 154(b) by 541 days.

(21) Appl. No.: 12/209,433

(22) Filed: Sep. 12, 2008

(65) Prior Publication Data

US 2010/0065003 A1 Mar. 18, 2010

(51) Int. Cl.
*F02M 35/10* (2006.01)

(52) U.S. Cl. ......... 123/184.34; 123/184.31; 123/184.35; 123/193.5

(58) Field of Classification Search ............... 123/90.27, 123/184.31, 184.34, 184.35, 193.5, 188.14, 123/559.1, 563; 60/598
See application file for complete search history.

(56) References Cited

U.S. PATENT DOCUMENTS

| | | | |
|---|---|---|---|
| 3,500,805 A * | 3/1970 | Reisacher | 123/54.4 |
| 4,327,698 A | 5/1982 | Hamai et al. | |
| 4,329,843 A | 5/1982 | Inoue et al. | |
| 4,458,491 A * | 7/1984 | Deutschmann | 60/612 |
| 4,879,980 A | 11/1989 | Piazzo | |
| 4,993,227 A | 2/1991 | Nagura et al. | |
| 5,207,714 A | 5/1993 | Hayashi et al. | |
| 5,440,881 A * | 8/1995 | Sudmanns et al. | 60/612 |
| 5,523,063 A | 6/1996 | Anderson | |
| 6,089,199 A * | 7/2000 | Lohr et al. | 123/90.38 |
| 6,470,867 B2 | 10/2002 | Akiwa et al. | |
| 6,513,506 B1 | 2/2003 | Ito et al. | |
| 6,672,296 B2 | 1/2004 | Ito et al. | |
| 6,776,146 B1 | 8/2004 | Ricart-Ugaz et al. | |
| 6,889,673 B2 | 5/2005 | Bender et al. | |
| 7,140,357 B2 | 11/2006 | Wei et al. | |
| 7,243,641 B2 | 7/2007 | Zukouski | |
| 7,363,761 B1 | 4/2008 | Dickerson | |
| 2001/0006056 A1* | 7/2001 | Ichikawa | 123/308 |
| 2002/0023599 A1* | 2/2002 | Laimbock | 123/59.6 |
| 2002/0088443 A1 | 7/2002 | Marthaler et al. | |

FOREIGN PATENT DOCUMENTS

JP 8284767 10/1996

OTHER PUBLICATIONS

Arnold, "Single Sequential Turbocharger: A New Boosting Concept for Ultra-Low Emission Diesel Engines," SAE Technical Paper Series, SAE International, Apr. 14-17, 2008 World Congress, Detroit, MI, USA.

* cited by examiner

*Primary Examiner* — Michael Cuff
*Assistant Examiner* — Hung Q Nguyen
(74) *Attorney, Agent, or Firm* — Jermoe R. Drouillard; Julia Voutyras

(57) ABSTRACT

An induction system for an internal combustion engine includes an upper intake for receiving air from a supply, such as a turbocharger, and a lower intake which combines a cylinder valve actuator cover, a plenum for receiving air from the upper intake, and a number of intake runners which extend across, an integrally with, the cylinder valve actuator cover to cylinder head intake ports which are configured at outboard sides of the engine cylinder head.

11 Claims, 4 Drawing Sheets

INDUCTION SYSTEM FOR INTERNAL COMBUSTION ENGINE

CROSS REFERENCE TO RELATED APPLICATIONS

None.

BACKGROUND OF THE INVENTION

1. Field of the Invention

The present invention relates to an internal combustion engine having inboard exhaust ports and outboard intake ports located within cylinder heads. The engine also has a lower intake functioning not only as an intake but, also, as a valve actuator cover.

2. Related Art

Internal combustion engine induction systems have become increasingly more sophisticated during the last few decades as a result of the need for improved fuel economy and lower emissions. Particularly in the case of compression ignition engines, turbocharging has risen to the fore. Efficient turbocharging demands that exhaust gases be collected and conducted through the exhaust turbine portion of the turbocharger, which must be matched with a compressor portion providing fresh air charge to the engine cylinders. In the case of a turbocharged Vee-block engine, the task of routing the exhaust and intake is particularly daunting because, with known engines, the exhaust ports on the cylinder heads are located outboard of the engine, and this necessitates long runs of hot exhaust gases which must be gathered at a common collection point and offered to the turbocharger. This causes a great deal of heat to be released to the engine compartment of a vehicle, and such heat release is certainly not a desirable characteristic of an induction system.

It would be desirable to provide an induction system for a turbocharged internal combustion engine in which the collection of the exhaust gases is done in the vee area of the engine, while introducing the charge air to the cylinders in a different area, so as to locate the hotter portions of the turbocharger-equipped induction system away from the charge air handing portion, thereby reducing heat-driven inefficiencies, while promoting the efficiency of the induction system.

SUMMARY OF THE INVENTION

According to an aspect of the present invention, an internal combustion engine includes an induction system with an upper intake for receiving air moving to the engine's cylinders, and a lower intake which is connected to the upper intake. The lower intake includes a cylinder valve actuator cover mounted upon a cylinder head of the engine. A centrally located plenum receives air from the upper intake. The plenum has a floor which is common, at least in part, with an upper portion of the valve actuator cover. A number of intake runners extends outboard from the plenum and across the valve actuator cover to an equal number of intake ports configured in the cylinder head. Each of the intake runners has a floor which is common, at least in part, with an upper portion of the valve actuator cover.

According to another aspect of the present invention, the structure of the lower intake and the valve actuator cover is preferably configured as one piece.

According to another aspect of the present invention, the plenum is preferably configured as an open plenum.

According to yet another aspect of the present invention, the intake ports are preferably divided into a swirl port and a helically directed port.

According to yet another aspect of the present invention, the lower intake further includes a number of injector ports, with the fuel injector ports each receiving a fuel injector mounted to the cylinder head.

According to another aspect of the present invention, an internal combustion engine may further include a turbocharger mounted in the valley of a Vee-block engine. The engine preferably includes a number of crossflow cylinder heads attached to a cylinder block, with each cylinder head having at least one outboard intake port and at least one inboard exhaust port, with the cylinder heads and the upper portion of the cylinder block defining a valley. A centrally located plenum receives air from an upper intake which is connected with an inter-cooler. As described before, a number of intake runners extend outboardly from the plenum and across the valve actuator cover to a number of outboard intake ports configured in the cylinder heads.

It is an advantage of an engine having an induction system according to the present invention that high efficiency may be achieved with a turbocharger, but without excessive rejection of heat to the environment immediately surrounding the engine.

It is yet another advantage of an induction system according to the present invention that a Vee-block engine may be produced in a much more compact fashion.

It is another advantage of an engine having an induction system according to the present invention that the length of the induction system provides an opportunity for excellent mixing of exhaust gas, in the form of exhaust gas recirculation, in the incoming air charge.

Other advantages, as well as features of the present invention, will become apparent to the reader of this specification.

DETAILED DESCRIPTION OF THE PREFERRED EMBODIMENTS

Figure 1:
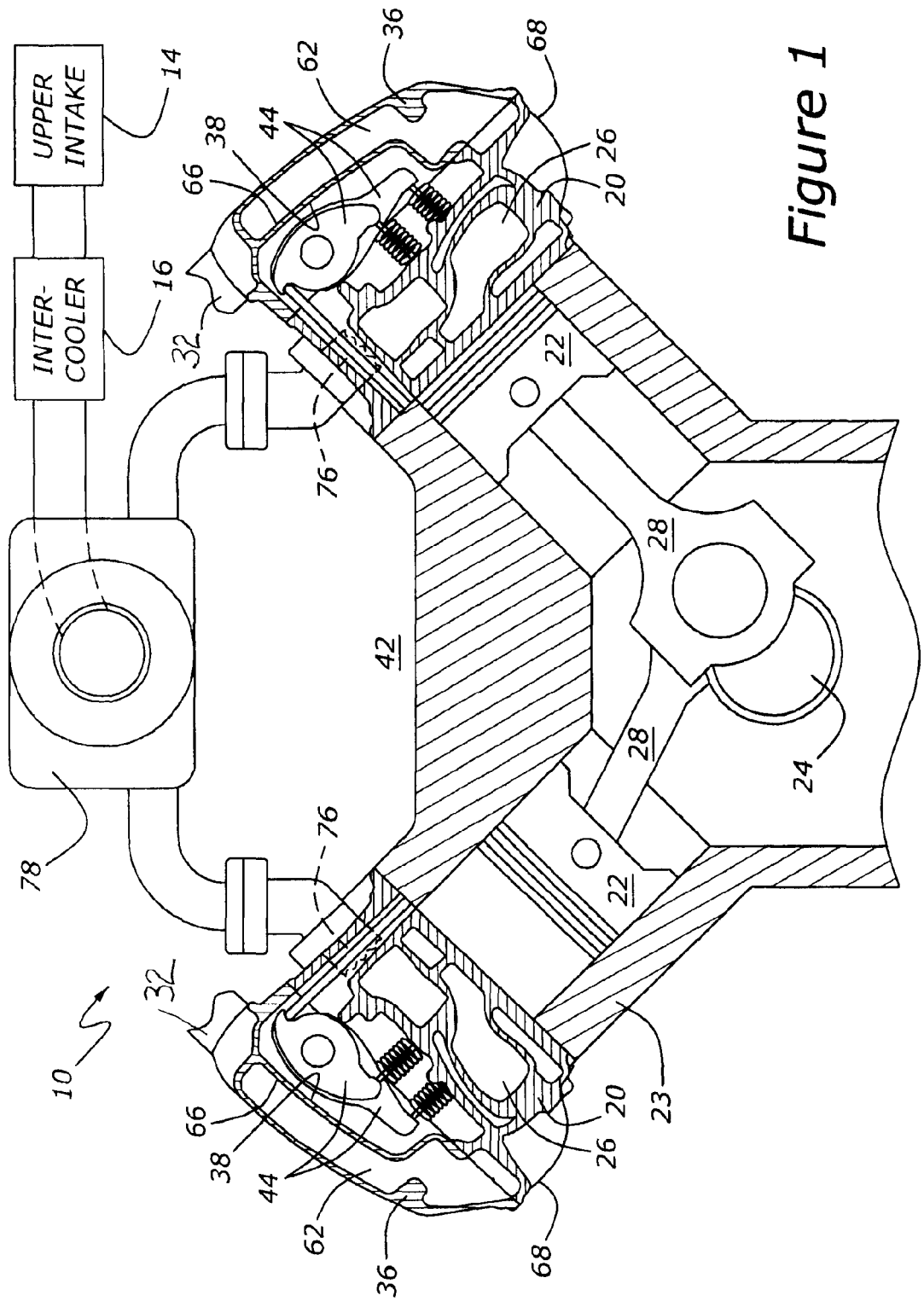
FIG. 1 is a partially schematic sectional view of a Vee-block engine according to one aspect of the present invention.

As shown in FIG. 1, engine 10 has a cylinder block, 23, housing a crankshaft, 24, and multiple pistons, 22, which are mounted to crankshaft 24 by connecting rods 28. Two cylinder heads, 20, are shown as being mounted upon cylinder block 23. Taken together, cylinder heads 20 and cylinder block 23 define a valley area, 42, which is occupied in part by a turbocharger, 78, which is connected with an intercooler, 16, and an upper intake, 14. FIG. 1 also shows intake runners, 62, which are part of a lower intake, 32. Intake runners 62 conduct air flowing from turbocharger 78 and through intercooler 16 and upper intake 14 to intake ports, 26, which are formed within cylinder heads 20.

Figure 2:
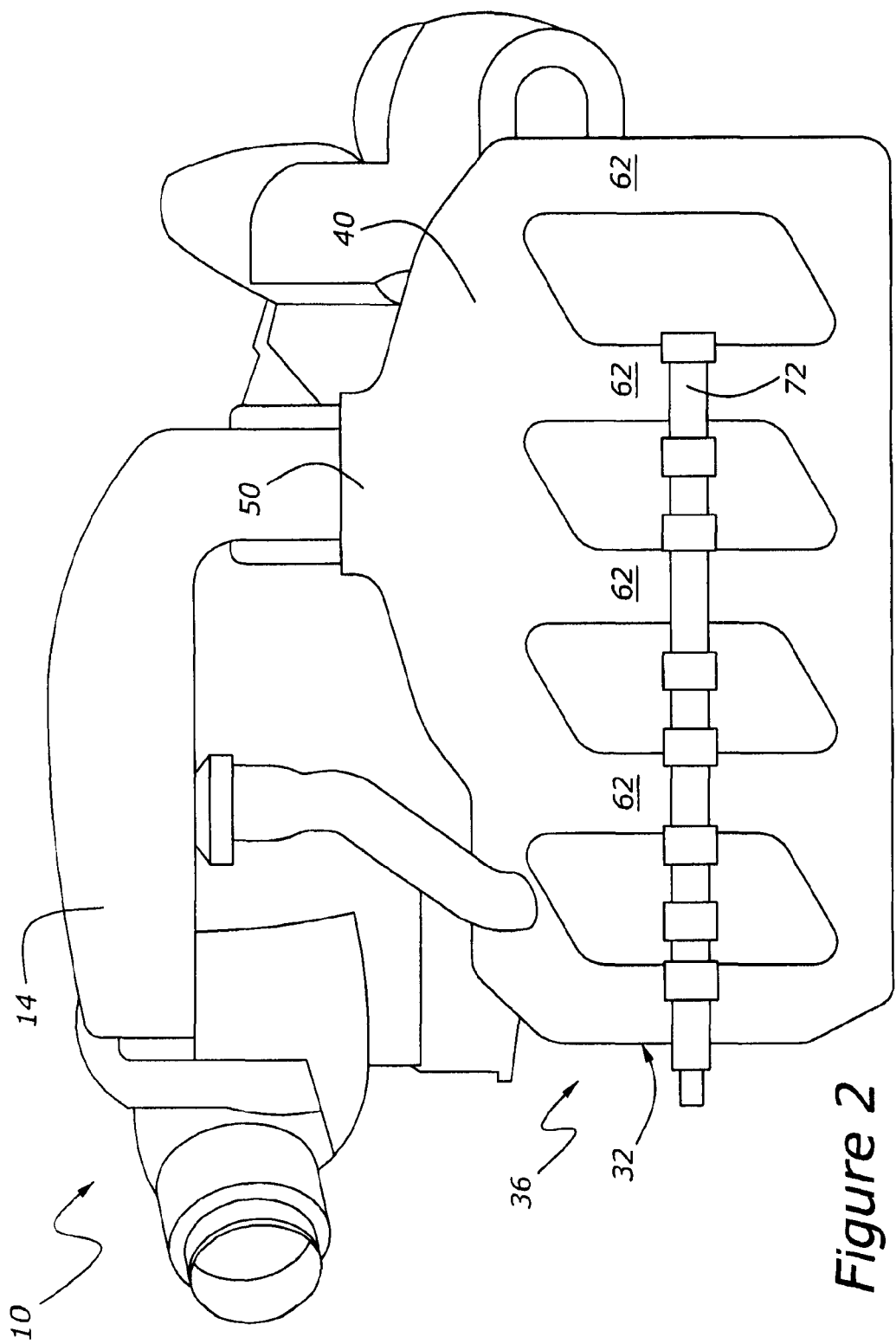
FIG. 2 is a partial side elevation of a Vee-block engine according to an aspect of the present invention.
Figure 3:
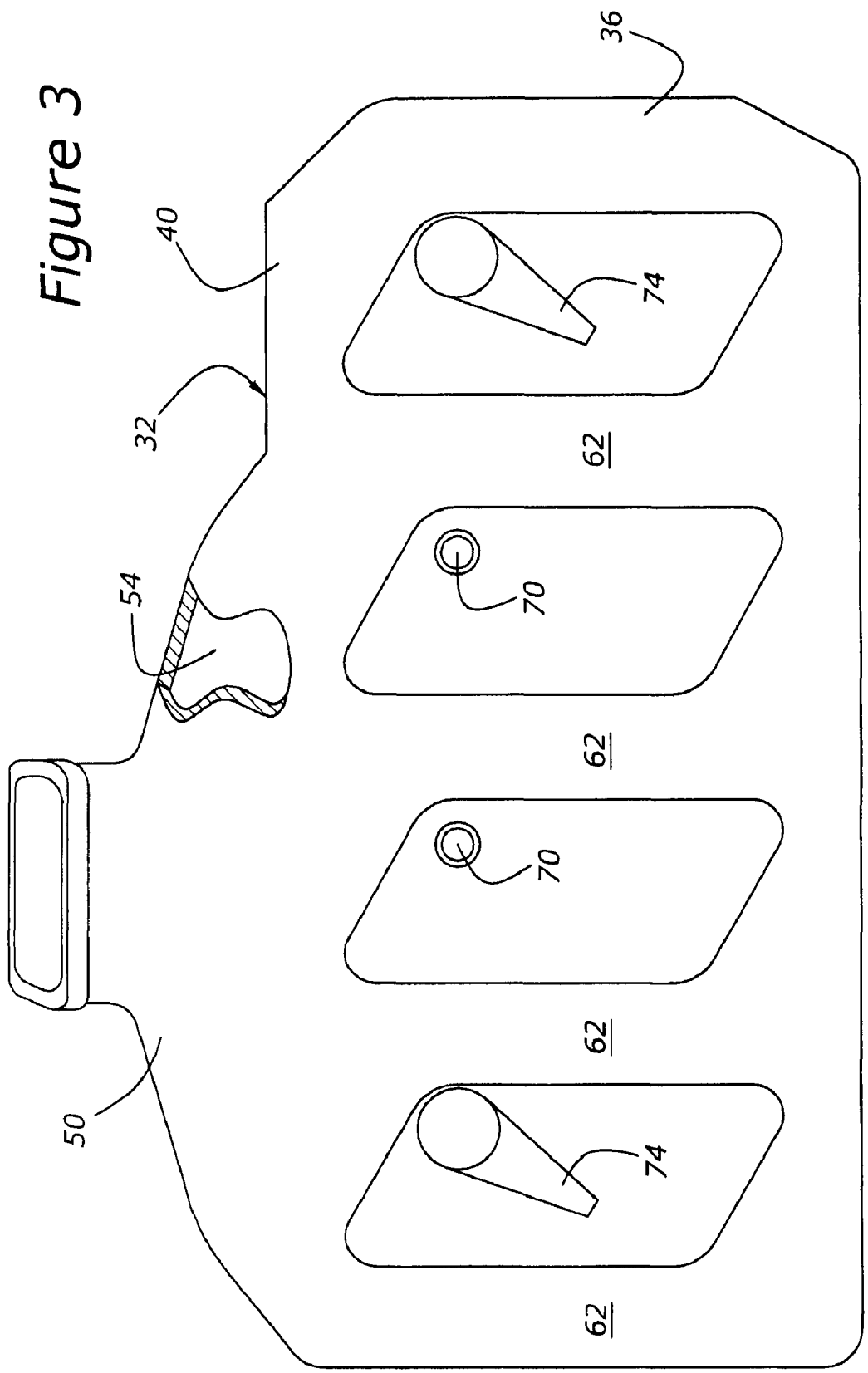
FIG. 3 is a plan view of a lower intake including a valve actuator cover according to an aspect of the present invention.

FIGS. 2 and 3 show details of upper intake 14 and lower intake 32. Lower intake 32 begins with a plenum, 50, which is connected with a number of intake runners, 62 (see also FIG. 1). Plenum 50, which is configured as an open plenum, is centrally located and receives air from an upper intake, 14.

Plenum 50 has a floor, 54, (FIG. 3) which is common with an upper portion, 40, of valve actuator cover 36. In other words, lower intake 32 includes both actuator cover 36 and intake runners 62. In a preferred embodiment, lower intake 32 is one piece with valve actuator cover 36. Lower intake 32 further provides a mounting structure for fuel rail 72. Cover 36 is said to be a valve actuator cover because it encloses rocker arms 44 (FIG. 1).

Figure 4:
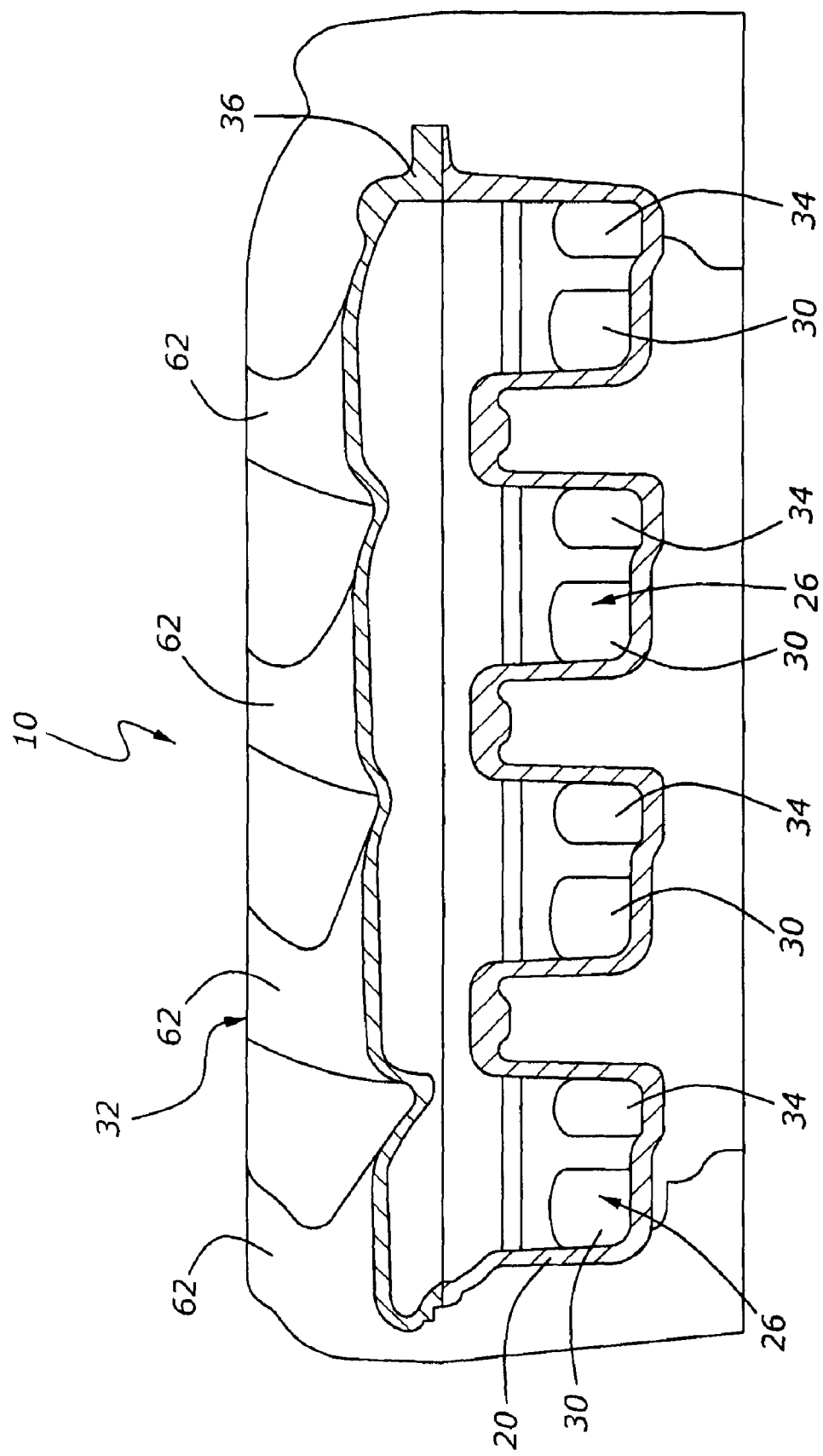
FIG. 4 is a side elevation, partially broken away, of a cylinder head according to an aspect of the present invention.

Intake runners 62 terminate in transition sections 68 (FIG. 1), which feed intake ports 26 located within cylinder heads 20. Each of intake ports 26 splits into a swirl port 30 and a helical port 34, which are shown in FIG. 4. Those skilled in the art will appreciate, in view of this disclosure however, that the present induction system could be employed with cylinder heads having but one intake valve and a single port or with more than two ports, with the choice of the number of ports and their particular configuration being committed to the discretion of those wishing to employ the present invention.

FIG. 1 also shows a sectional view of intake runners 62 and, particularly, the runner floors, 66, which are common with upper portions 38 of valve actuator cover 36. FIG. 1 also shows intake rocker arms, 44, which are enclosed by lower intake 32 as embodied in valve actuator cover 36. FIG. 1 further shows exhaust ports 76, which extend inboard to valley 42 and which connect with turbocharger 78.

FIG. 3 illustrates the mounting of fuel injectors, 74, which pass through injector ports 70 formed in lower intake 32. Injectors 74 are interposed between adjacent runners 62, thereby allowing runners 62 to be fully formed and very effective for transferring air from plenum 50 to intake ports 26.

Another advantage of the present invention is provided by transition sections 68 (FIG. 1), which accommodate the flow of charge air from intake runners 62 to intake ports 26. Because transition sections 68 have a common configuration, such that the configuration of each of transition sections 68 is essentially the same as the configuration of all other such transition sections 68, the present induction system provides a very closely matched mass flow, or amount of air per charge, to each of the engine's cylinders. This is advantageous because the matching of the airflow permits smoother engine operation with less objectionable noise and lower exhaust emissions.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. An internal combustion engine, having an induction system comprising:
    an upper intake for receiving air moving to the engine's cylinders; and
    a lower intake, connected to the upper intake, with the lower intake comprising:
        a cylinder valve actuator cover mounted upon a cylinder head of the engine;
        a plenum for receiving air from the upper intake, with the plenum having a floor which is common at least in part, with an upper portion of said cover;
        a plurality of injector ports, with each of said injector ports receiving a fuel injector mounted to said cylinder head; and
        a plurality of intake runners extending outboard from the plenum and across said cover to a plurality of intake ports configured in the cylinder head, with each of said intake runners having a floor which is common at least in part, with the upper portion of said cover, and with each of said intake ports being divided into a swirl port and a helically directed port.

2. An internal combustion engine according to claim 1 wherein said lower intake and said valve actuator cover are configured as one piece.

3. An internal combustion engine according to claim 1, wherein said plenum is configured as an open plenum.

4. An internal combustion engine according to claim 1, further comprising a turbocharger for furnishing compressed air to said upper intake.

5. An internal combustion engine according to claim 4, wherein said turbocharger is mounted in a valley of a vee-block engine.

6. An internal combustion engine according to claim 5, wherein said turbocharger is provided with exhaust gases from a plurality of inboard exhaust ports.

7. An internal combustion engine according to claim 1, wherein said plenum is centrally located with respect to the engine.

8. An internal combustion engine, having an induction system comprising:
    a turbocharger;
    an upper intake, connected with said turbocharger, for receiving air moving to the engine's cylinders; and
    a one-piece lower intake, connected to the upper intake, with the lower intake comprising:
        a cylinder valve actuator cover mounted upon a cylinder head of the engine;
        a plenum for receiving air from the upper intake, with the plenum having a lower floor which is common, at least in part, with an upper portion of said cover;
        a plurality of intake runners extending outboard from the plenum and across said cover to a plurality of intake ports configured in the cylinder head, with each of said intake runners having a floor which is common, at least in part, with the upper portion of said cover and with each of said intake ports being divided into a swirl port and a helically directed port; and
        a plurality of injector ports, with each of said injector ports receiving a fuel injector mounted to said cylinder head.

9. An internal combustion engine according to claim 8, wherein said upper intake receives air flowing from said turbocharger and through an intercooler.

10. A vee-type internal combustion engine comprising:
    a cylinder block;
    a plurality of crossflow cylinder heads attached to said cylinder block, with each head having an outboard intake port divided into a swirl ort and a helically directed port, and at least one inboard exhaust port, and with said cylinder heads and an upper portion of said cylinder block defining a valley;
    a turbocharger located in said valley, with said turbocharger receiving exhaust gases from the exhaust ports and feeding compressed air to an intercooler;
    an upper intake, connected with said intercooler, for receiving air moving, to the engine's cylinders; and a plurality of one-piece lower intakes connected to the upper intake, with each of said lower intakes comprising:
  a cylinder valve actuator cover mounted upon one of said cylinder heads;
  a centrally located plenum for receiving air from the upper intake, with the plenum having a lower floor which is common, at least in part, with the upper portion of said cover;
  a plurality of intake runners extending outboard from the plenum and across said cover to a plurality of intake ports configured in one of said cylinder heads, with each of said intake runners having a floor which is common, at least in part, with an upper portion of said cover;
  a plurality of injector ports, with each of said injector ports receiving a fuel injector mounted to one of said cylinder heads; and
  a fuel rail mounted to said lower intake and overlying said intake runners.

11. An internal combustion engine according to claim 10, further comprising a plurality of transition sections, wherein each of said intake runners is connected to one of said intake ports by one of said transition sections, and with each of said transition sections having a configuration which is common with the configuration of all other such transition sections.

* * * * *